United States Patent
Olszowka

[11] Patent Number: 6,139,181
[45] Date of Patent: Oct. 31, 2000

[54] METHOD AND APPARATUS FOR DETERMINING A TEMPERATURE OF AN INDUCTIVELY HEATED GODET BY MEASURING CURRENT THROUGH AND VOLTAGE ACROSS A PRIMARY WINDING

[75] Inventor: Henryk Olszowka, Giessweg, Germany

[73] Assignee: Zinser Textilmaschinen GmbH, Ebersbach/Fils, Germany

[21] Appl. No.: 09/110,565

[22] Filed: Jul. 6, 1998

[30] Foreign Application Priority Data

Jul. 16, 1997 [DE] Germany .............. 197 30 531

[51] Int. Cl.$^7$ .................................................. G01K 13/00
[52] U.S. Cl. ................................ 374/152; 374/141
[58] Field of Search .......................... 374/152, 183, 374/141

[56] References Cited

U.S. PATENT DOCUMENTS 4,897,011  1/1990  Grutzmacher et al. ............... 374/152
5,645,352  7/1997  Menten ............................... 374/183

FOREIGN PATENT DOCUMENTS

| 1 901 902 | 1/1969 | Germany . |
| 2 108 825 | 9/1972 | Germany . |
| 40 24 432 C2 | 12/1992 | Germany . |
| 2164177 | 3/1998 | United Kingdom .......... 374/152 |

Primary Examiner—Diego Gutierrez
Assistant Examiner—Stanley J. Pruchnic, Jr.
Attorney, Agent, or Firm—Herbert Dubno

[57] ABSTRACT

The temperature of a galette or godet is determined for the godets of a spinning machine for synthetic yarn, by evaluating the calibration curve for temperature as a function of voltage and current of the primary windings of the godets and a correction factor is established for temperature as a function of voltage. The automatic control is provided to effect that evaluation.

10 Claims, 3 Drawing Sheets

METHOD AND APPARATUS FOR DETERMINING A TEMPERATURE OF AN INDUCTIVELY HEATED GODET BY MEASURING CURRENT THROUGH AND VOLTAGE ACROSS A PRIMARY WINDING

FIELD OF THE INVENTION

The present invention relates to a method of and to an apparatus for determining the temperature of an inductively heated element, especially, each of the godets or galettes of a spinning machine for producing yarn from synthetic filaments.

BACKGROUND OF THE INVENTION

In the production of yarn from synthetic filaments, e.g. thermoplastic synthetic resin filaments, spinning machines are used which are capable of stretching and spinning the filaments or yarn. The filaments or yarn can be passed over or around so-called godets or galettes which can include heated drums with the filaments or yarn passing in one or more turns around the periphery thereof. The temperature of the surface of the godet, with which the synthetic threads are in contact, must be maintained within limited tolerances and held at certain values for suitable thread and yarn production and must, if the properties of the thread or yarn to be maintained constant and constant processing speed is to be maintained, also be held constant.

As a consequence, known spinning machines for this purpose usually include one or more sensors capable of detecting temperatures of the surface of the godet contacted by the yarn or thread and which outputs a signal utilized for control circuitry. The control circuitry, in turn, can operate a heating element of the godet or a heating element capable of transferring heat to the godet and thus a heating element or unit which can be located within the godet or outside the godet and which serves to maintain a desired set point temperature within certain limits.

The temperature sensor can be arranged in various ways. For example, the temperature sensor can be embedded in the surface of the godet (DE OS 21 08 825). In this case, however, only one location along the periphery of the godet can be sensed so that different temperatures over the godet surface usually cannot be detected. It has been proposed, therefore, to provide annular temperatures sensors which can be integrated in a groove of an inner surface of a godet (DE-OS 1 901 902). These overcome the aforedescribed drawback, but the sensor signal must be conducted from the rotating godet to the stationary part of the machine and can involve expensive and unreliable slip rings and a signal transmission path which is prone to mechanical failure or in the case of wireless signal transmission, may suffer from the development of noise or other perturbations.

DE 40 24 432 C2 describes a process for determining the temperature of an inductively heated machine part in which the heated element is included in or has a secondary heating winding which is inductively coupled to a primary winding. An electronic current is passed through the primary winding and induces the heating current in the secondary winding. The temperature of the heated element can then be determined by a measurement of the current passing through the primary winding and by a measurement of the voltage generated across the secondary winding. In a calibration process, the ohmic resistance $R_2$ of the heated machine part or heating element is determined as a function of its temperature T and is calculated from the relationship $T=f_T(R_2)$ as stored. The current $I_L$ through the main inductance is measured as a function of the voltage drop $U_L$ and the function $I_L=f_L(U_L)$ is calculated and stored. As a measurement of the voltage drop at the main inductance, the induced voltage in the secondary measurement winding is used. In operation, the temperature T can then be calculated in accordance with the relationship $T=f_T\{U_L/(I_A-f_L(U_L))\}$ (see DE 40 24 432 C2).

This process has, however, the drawback that a measuring secondary winding is required and, in addition, the calibration step requires an extremely large number of points in order to enable the temperature dependency of the ohmic resistance of the heated element to be determined. The same applies for the measurement of the current through the main inductance as a function of the voltage drop at the main inductance.

OBJECTS OF THE INVENTION

It is the principal object of the present invention, therefore, to provide a method of and an apparatus for determining the temperature of an inductively heated element, especially a godet or galette of a spinning machine for the production of synthetic threads, whereby the temperature of the heated element is determined in an especially simple manner, without significant computer costs and with a minimum effort at calibration.

It is also an object of the invention to provide an improved apparatus for use in detecting the temperature of the godet which does not require a measurement winding at the secondary side for the determination.

It is also an object of the invention to provide a method of and an apparatus for determining with accuracy the temperature of a godet in a spinning machine for synthetic resin filaments and yarn which is free from the drawbacks of earlier systems as noted.

SUMMARY OF THE INVENTION

These objects and others which will become apparent hereinafter are attained, in accordance with the invention, in a method of determining the temperature of an inductively heated element, especially the temperature of each godet of a spinning machine for producing synthetic threads which comprises the steps of:

(a) heating the element by passing an electric current through a primary winding inductively coupled to a secondary winding having at least part of the element formed as a load of the secondary winding;

(b) in a calibration stage applying a predetermined constant primary voltage ($U_0$) across the primary winding and ($b_1$) measuring a first pair of values ($I_1$) and ($T_1$) of a current through the primary winding and a temperature induced thereby in the element and measuring at least one further pair of values ($I_2$) and ($T_2$) of the current through the primary winding and the temperature induced thereby in the element, and ($b_2$) from at least two of the pairs of values measured in step ($b_1$) calculating a calibration curve $T=F_0\neq(U_x/I_x)$ for the predetermined constant primary voltage ($U_0$); and (c) in an operating phase of the element, determining an actual value of the temperature of the element by measuring an actual primary voltage ($U_x$) applied across the primary winding or a parameter coupled therewith and determining the corresponding actual temperature (T) by the relationship $$T = F_0(U_x/I_x) + \Delta T(U_x - U_0)$$

where $\Delta T(U_x - U_0)$ is a purely voltage-dependent correction factor.

The apparatus can comprise:

means for heating the element including a primary winding, a secondary winding inductively coupled to the primary winding and having at least part of the element formed as a load of the secondary winding and means for applying a voltage across the primary winding to effect the flow of an electric current through the primary winding;

means for measuring, in a calibration stage, a current flow through the primary winding or a parameter coupled to the current flow;

means for measuring a voltage applied across the primary winding or a parameter coupled therewith; and evaluating means connected to the measuring means for receiving signals representing the current and the voltage and calculating therefrom a temperature of the element.

According to the invention, the calibration curve has the form $T = A \cdot U_x/I_x + B$ where A and B are constants.

A is the slope determined by interpolation or extrapolation between two pairs of values $(I_1, T_1)$, $(I_2, T_2)$ by the relationship $A = (T_2 - T_1)/(U_0/I_2 - U_0/I_1)$ and B is determined by the relationship $B = (U_0/I_2 \cdot T_1 - U_0/I_1 \cdot T_2)/(U_0I_2 - U_0I_1)$.

The correction factor $\Delta T(U_x - U_0)$ is determined in a further calibration stage by collecting further pairs of values $(T_i, U_i/I_i)$ at $U_i \neq U_0$ and establishing a relationship $\Delta t_i = T_i - F_0(U_i/I_i)$ therebetween, said correction factor being calculated from the values of $\Delta t_i$.

The invention is based upon the fact that the actual temperature T of the inductively heated godet can be established in a simple manner by a measurement of the actual primary voltage $U_x$ and the actual primary current $I_x$ or parameters which are coupled therewith using the relationship $T = F_0(U_x/I_x) + \Delta T(U_x - U_0)$.

By a sequence of measurements at the different godets, the temperature of the latter can be obtained and the dependency of different parameters with different godet types and will yield different calibration curves $F_o$ $(U_x/I_x)$ in terms of measured or empirically determined dependency or calibration functions which can be calculated. In practice it is found that all of these curves depend upon the voltage $U_x$ at the primary winding and differ predominantly by a purely parallel shift in the direction of the T axis. In other words, the temperature of the heated elements can be determined with greater precision simply by measurement of the values of $U_x$ and $I_x$ at the primary winding utilizing calibration curves which are derived from a calibration step involving the application of a constant voltage $U_o$ which can be equal to $U_x$ and which gives the function $F_o$ $(U_0/I_x)$. The temperature can be calculated in the case where $U_x$ is not equal to $U_o$ by a correction utilizing the purely voltage dependent correction factor $\Delta T(U_x - U_o)$.

In a preferred embodiment of the invention, the calibration curve has the form.

$T = A \cdot U_x/I_x + B$, where A and B are constants and represent the slope and the ordinate intercept (temperature axis intercept) respectively. Test series have shown that this linear approximation of the function dependency $F_o$ will provide the requisite precision for temperature settings of about ±1K to a sufficient degree.

The slope A of the linear dependency can be calculated at low cost by determining only two pairs of values $(I_1, T_1)$ and $(I_2, T_2)$ with a constant voltage $U_x = U_0$ by the relationships $A = (T_2 - T_1)/(U_0/I_2 - U_0/I_1)$ and $B = (U_0/I_2 \cdot T_1 - U_0/I_1 \cdot T_2)/(U_0I_2 - U_0I_1)$.

It will be self understood that it is also possible to determine the parameters A and B by evaluating a greater number of points and by linear approximation.

This calibration process for determining the functional dependency $F_o$ can be carried out in a simple manner as required or the intervals determined by a timing relationship by the user of the respective spinning machine.

In practice, it has been found that the values for godets of different types are dependent upon the fabrication tolerances of the godet and the different heating characteristics and thus have different calibration curves $F_o$, i.e. different values for the slope A and the ordinate intercept B but that the correction function $\Delta T$ $(U_x - U_o)$ largely is invariable. This creates the possibility that the correction $\Delta T$ can be determined once at fabrication and prior to assembly of the spinning machine and the correction value can be incorporated in and stored in the computer or other controller for determining the temperature.

However, even this value can be determined as required or at time spaced intervals, e.g. by the user of the machine.

One can obtain the plot of the correction dependency from a determination utilizing a multiplicity of points $(T_I, U_I/I_I)$ at $U_I \neq U_o$ and with calculation of the curve based upon the relationship $(\Delta t_I = T_{I-F0}(U_I/I_I)$. For optional values of $U_x$, $\Delta T$ $(U_x - U_o)$ are then calculated by interpolation/extrapolation (with $\Delta T(0) = 0$).

It has been found in practice moreover that because of the slight curvature of the graph of $\Delta T$ it is advantageous to determine one point $(T_I, U_I/I_I)$ at $U_I > U_o$ and another point at $(T_{II}, U_{II}/I_{II})$ at $U_{II} < U_0$ and in the region between $U_x > U_0$ to interpolate between the points $\Delta T_0$ and $\Delta T_I$ and to interpolate in the region $U_x < U_0$ between the points $\Delta T_0$ and $\Delta T_{II}$. At the dependency $\Delta T$ $(U_x - U_0)$ can be approximated at least for smaller voltage ranges $(U_x - U_0)$ with high precision by straight lines.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
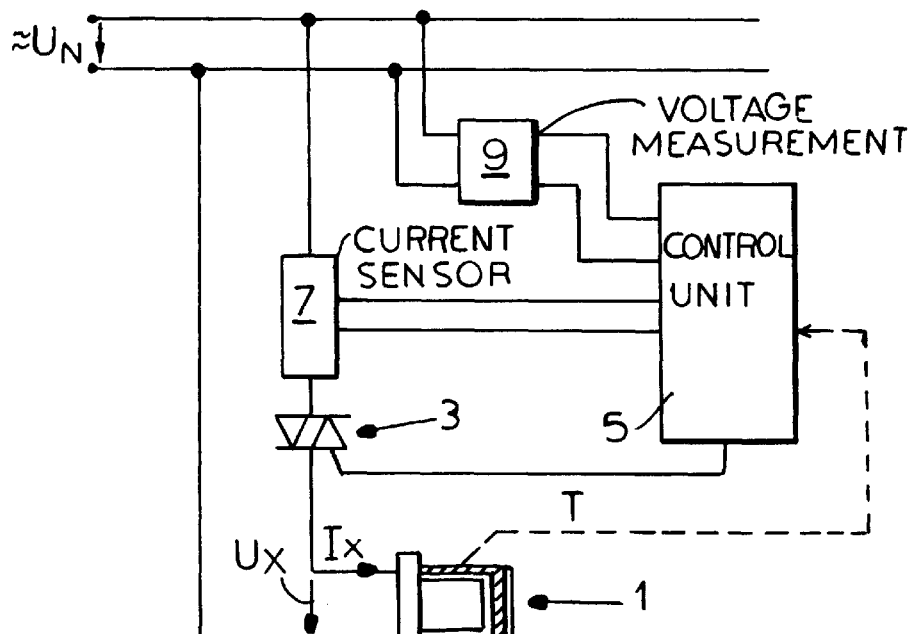
FIG. 1 is a circuit diagram illustrating a device for determining the temperature of an inductively heated element according to the invention.

In the production of synthetic filament yarn, it is common practice to heat a filament 20 (FIG. 5) by passing it over a heated element or godet 21 and between two or more godets such as the godets 21 and 22, with the filament threads being passed around the periphery of the godet drums with or without the aid of grooves in the periphery. Such godets have been termed galettes in the past and the drums can be rotated at appropriate speeds to provide tension or stretch of the yarns by respective drives not shown.

The yarn can then be spun in the spinning machine represented as a whole at 25 on a bobbin 26 utilizing a traveller ring 27, a traveller 28, a spindle 29 and the ring rail 30. The bobbin and the ring rail move relatively in the vertical direction to distribute the synthetic filament yarn along the bobbin.

Figure 6:
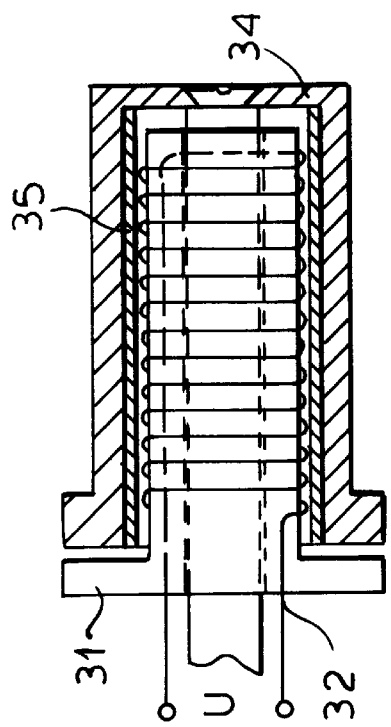
FIG. 6 is a diagrammatic cross sectional view showing the primary and secondary winding characteristics of such a godet.

The godet can be inductively heated according to the invention and for that purpose, the stationary core 31 of the godet (FIG. 6) can be provided with a primary winding 32 as has been described previously to which a voltage U is applied and in which a primary current I flows. That winding induces in a copper lining 35 of the steel drum 34 of the godet, which rotates relative to the core by means not shown here but standard in godet design, a secondary current subjected to the ohmic resistance of that lining to generate the heat which heats the outer member and hence the drum to a temperature T.

Figure 5:
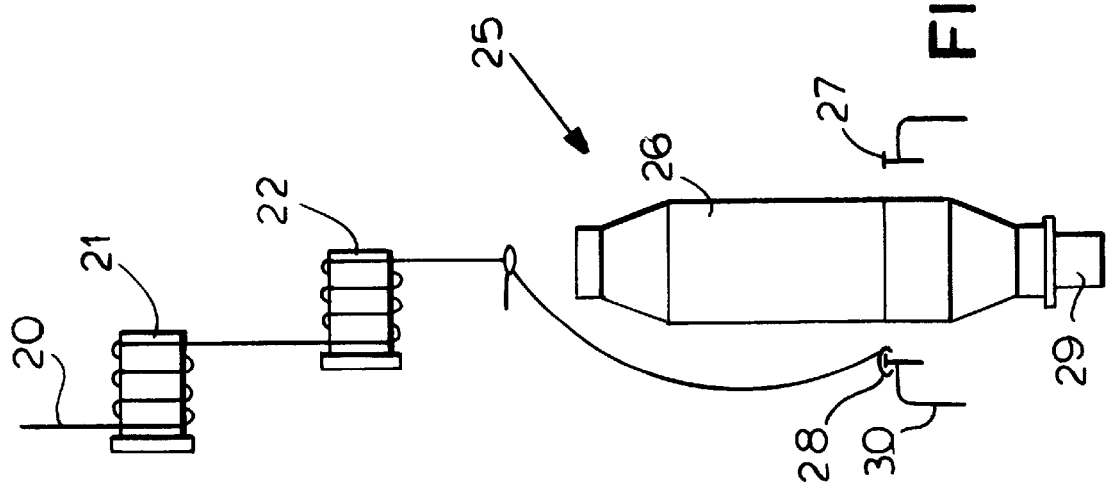
FIG. 5 is a diagram of one station of a spinning machine provided with godets in accordance with the invention.

FIG. 1 shows a device for determining the temperature of a heated element which can be either of the godets shown in FIG. 5 for each of the spinning stations of the spinning machine, it being understood that each spinning station may have a plurality of inductively heated godets and that the spinning machine as a whole will normally have a large number of spinning stations.

Each of the godets 1 in FIG. 1 can have a primary winding connected with a voltage source and the voltage source, represented $U_n$ may be common to all of the godets of the entire machine or to groups of godets of the machine. In FIG. 1 the supply voltage source $U_n$ is shown to be an alternating current source.

As a consequence, the primary winding induces the heating current in the secondary winding to raise the temperature of the godet drum to the desired level.

The primary winding of each godet 1 is controlled in the usual manner via a controllable electronic switch 3, for example a thyristor, the controllable electronic switch 3 in turn being controlled by the control unit 5.

As is the case with transistor circuitry for AC inputs for transformers, the primary winding is energized with line frequency or some other frequency which may be desirable and referred to as the keying ratio so that the thyristor is triggered on for certain durations at that frequency, these durations being referred to as the ontime $T_e$ so that the voltage $U_x$ is applied to the primary winding of the godet.

The voltage at the primary winding ideally is the same as the supply voltage $U_n$ although in practice it is possible that switching resistance in the electronic circuitry can reduce that voltage slightly below voltage $U_n$ The current $I_x$ flows during the switching time $T_e$ and can be detected by a current sensor 7. The measured value of the current is supplied to the controller 5. The current measuring unit 7 can be a current/voltage converter so that the control unit 5 is supplied with a voltage proportional to the current $I_x$.

In addition, a voltage measuring unit 9 is provided for measuring the voltage $U_n$ and to supply to the controller 5 a voltage signal which is proportional to the measured voltage.

The direct measurement of the supply voltage $U_n$ which is proportional or equal to the primary winding $U_x$ has the advantage that with machines having large numbers of godets or heatable elements, only one voltage measuring unit is required.

Figure 2:
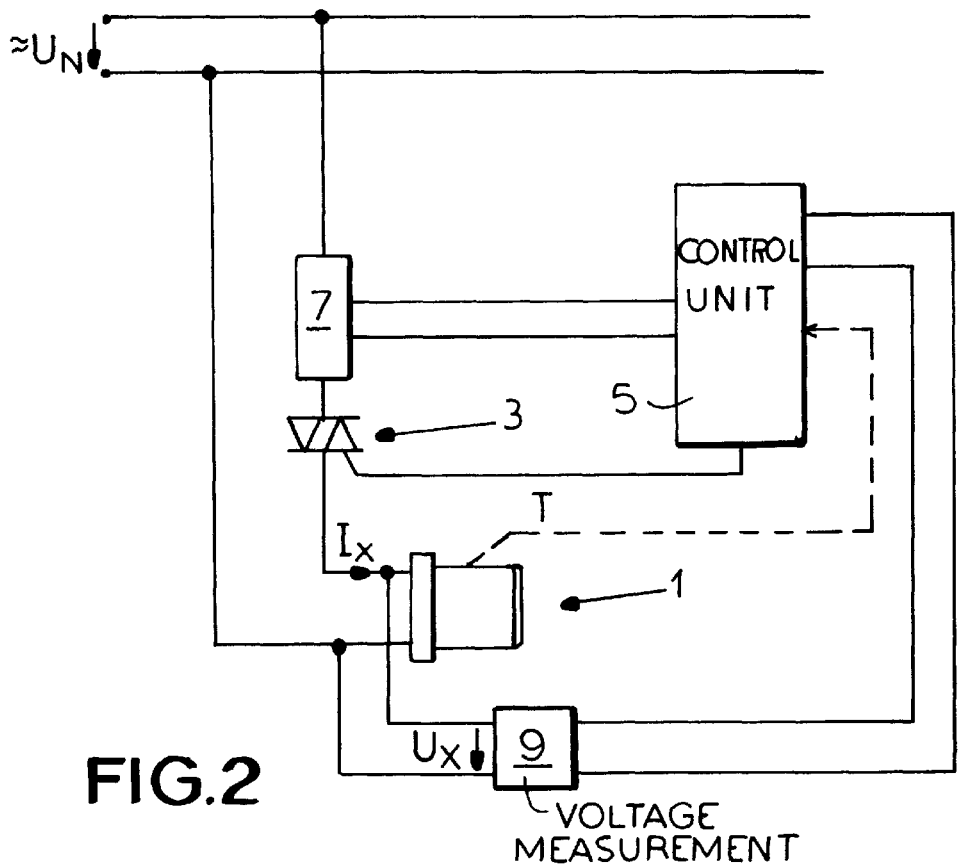
FIG. 2 is a diagram similar to FIG. 1 illustrating another embodiment.

In general, the switching resistance will be the same and trivial for all of the electronic switches and hence the use of a single element for voltage will not create a problem and any differences can be tolerated. However, if another circuit requires it, separate voltage detection units can be provided for each primary winding. This has been shown for the voltage measurement unit 9 of FIG. 2.

In this case, multiplexing can be used to provide the controller 5 with current, voltage and temperature inputs from the entire array of godets.

For the subsequently described calibration, of course, it makes no difference whether the voltage $U_x$ is actually measured at the particular primary winding or is selected as a value proportional to the voltage $U_n$.

Figure 4:
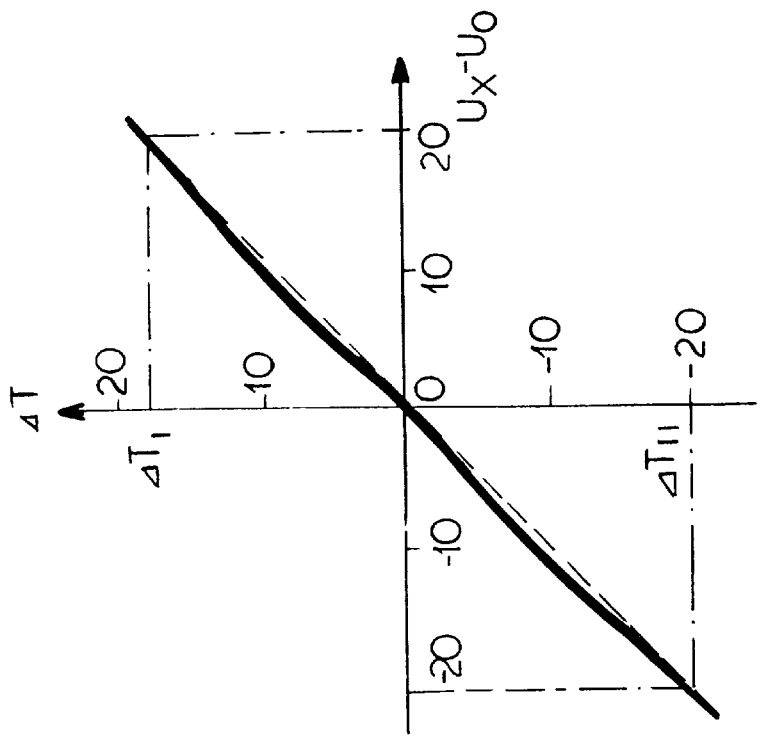
FIG. 4 is a graph explaining the correction factor for that calibration curve.
Figure 3:
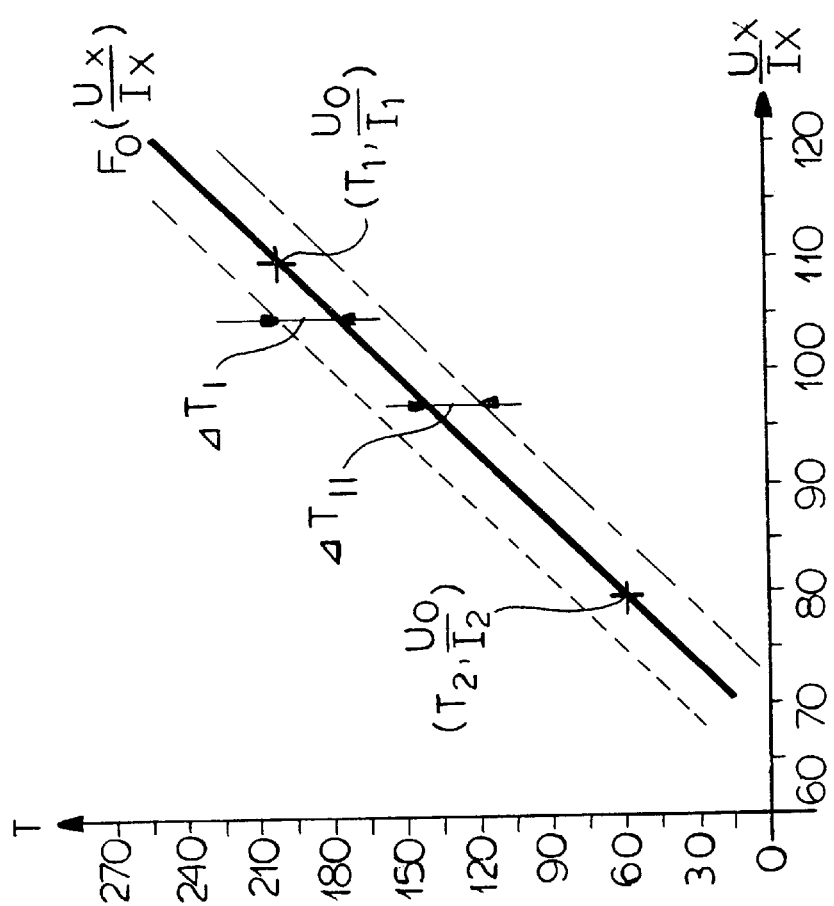
FIG. 3 is a graph for explaining the calibration curve.

FIGS. 3 and 4 illustrate the determination of the temperature of the godet.

Basically, the temperature of the heated element or godet 1 can be described by the equation $T=F_0 (U_x/I_x)+\Delta T(U_x/U_0)$. The calibration factor $F_0 (U_x/I_x)$ shows that the temperature of the heated element has the form of the ratio $U_x/I_x$ at a constant voltage $U_x=U_0$. FIG. 3 shows the graph of the calibration curve $F_0$ which, for a voltage $U_x=U_0$ gives the temperature of the heated element.

The graph $F_0$ shows that at a constant voltage $U_x$, the temperature of each heated element 1 is dependent upon a setting S which can be defined as the ratio of switching time $T_e$ of the electronic switch divided by the period of the switching. The maximum temperature is obtained with a setting S=1, i.e. "on" all the time. The minimum temperature is defined by the setting S=0 (applied voltage off all the time).

For the calibration, the calibration curve $F_0$ can be determined simply by adjusting the setting from a minimum to a maximum continuously or in a stepwise manner and obtaining a corresponding number of points $(T,U_x/I_x)$ for a constant voltage (for example, the main operating voltage) $U_x=U_0$. For this purpose, a temperature sensor measuring the temperature of the surface of the heated godet (broken lines in FIGS. 1 and 2) can be used.

Since as FIG. 3 shows, the graph of the calibration curve $F_0$ is practically linear. It suffices to obtain two points, in this case $(T_1, U_o/I_1)$ and $(T_2, U_0/I_2)$ to calculate the slope A and the ordinate intercept B for the straight line $T=F_0 (U_x/I_x)+ \Delta T(U_x/U_0)$.

Of course, to increase the precision a greater number of points can be determined and the parameters A and B obtained by linear approximation.

It has been found that for certain types of heatable elements that there may be different calibration graphs but that the correction factor $\Delta T (U_x-U_0)$ is practically independent of the fabrication parameters or other characteristics of such elements.

In other words there is a shift in the calibration curve $F_0$ in the direction of the temperature axis with changes in the applied voltage $U_x$ but no other changes in the calibration graph.

This is shown in FIG. 3 by the dot dash line and broken line curves. The broken line curve represents a constant operating voltage $U_x>U_0$ and the dot dash curve an operating voltage $U_x<U_0$.

For determining the temperature dependency with a voltage different from the calibration voltage $U_0$ it suffices to detect only a single other pair of values $(T_I,U_I/I_I)$ and then calculate the correction $\Delta T_I=T_I-F_0 (U_I/I_I)$.

To establish the voltage dependency of the correction factor, within an operating range $\Delta U_x - U_0$, a number of values $\Delta T(\Delta U)$ are determined and stored or the relationship is established and stored.

FIG. 4 shows that the correction dependency $\Delta T(\Delta U)$ is also linear to a good approximation at least in the region $\Delta U < 20$ volts with a supply voltage of $U_n = 230$ volts and can be represented by a linear graph. In practice it has been found that from the mean operating voltage $U_n - U_0$ (e.g. 230 volts) only correction values $\Delta T_I$ (e.g. $\Delta T_u = +20$ volts) and $\Delta T_{II}$ (for $\Delta_u = -20$ volts) need be obtained and the curve interpolated and extrapolated for the region $\Delta_u > 0$ between the points $\Delta T_0 = 0$ and $\Delta T_1$ and for the region $\Delta U < 0$ between the points $\Delta T_0 = 0$ and $\Delta T_2$. The actual correction factor $\Delta T$ as a function of $U_x - U_o$ has a slightly curved graph as is visible in FIG. 4.

I claim:

1. A method of determining temperature of at least one inductively heated element, comprising the steps of:

(a) heating said element by passing an electric current through a primary winding inductively coupled to a secondary winding having at least part of said element formed as a load of said secondary winding;

(b) in a calibration stage applying a predetermined constant primary voltage ($U_0$) across said primary winding and ($b_1$) measuring a first pair of values ($I_1$) and ($T_1$) of a current through the primary winding and a temperature induced thereby in said element and measuring at least one further pair of values ($I_2$) and ($T_2$) of the current through the primary winding and the temperature induced thereby in said element, and ($b_2$) from at least two of the pairs of values measured in step ($b_1$) calculating a calibration curve $T = F_0 \neq (U_x/I_x)$ for said predetermined constant primary voltage ($U_0$) where $U_x$ and $I_x$ are measured values of voltage and current; and (c) in an operating phase of said element, determining an actual value of said temperature of said element by measuring an actual primary voltage ($U_x$) applied across said primary winding and determining the corresponding actual temperature (T) by the relationship $$T = F_0 (U_x/I_x) + \Delta T(U_x - U_0)$$

where $\Delta T(U_x - U_0)$ is a purely voltage-dependent correction factor.

2. The method defined in claim 1 wherein the calibration curve has the form $$T = A \cdot U_x/I_x + B$$

where A and B are constants.

3. The method defined in claim 2 wherein A is a slope determined by interpolation or extrapolation between two pairs of values ($I_1$, $T_1$), ($I_2$, $T_2$) by the relationship $$A = (T_2 - T_1)/(U_0/I_2 - U_0/I_1)$$

and B is determined by the relationship $$B = (U_0/I_2 \cdot T_1 - U_0/I_1 \cdot T_2)/(U_0/I_2 - U_0/I_1).$$

4. The method defined in claim 1 wherein said correction factor $\Delta T(U_x - U_0)$ is determined in a further calibration stage by collecting further pairs of values ($T_i$, $U_i/I_i$) at $U_i \neq U_0$ and establishing a relationship $$\Delta T_i = T_i - F_0 (U_i/I_i)$$

therebetween, said correction factor being calculated from the values of $\Delta T_i$.

5. The method defined in claim 4 wherein the correction factor for each such element is determined once and stored and during the calibration stage, the calibration steps b, $b_1$ and $b_2$ are repeated for each of said elements.

6. The method defined in claim 1 wherein said element is an inductively heated godet of a spinning machine for producing synthetic filament yarn.

7. A heating apparatus with at least one inductively heated element and means for determining the temperature of an inductively heated element comprising:

means for heating an inductively heated including a primary winding, a secondary winding inductively coupled to said primary winding and having at least part of said element formed as a load of said secondary winding and means for applying a voltage across said primary winding to effect the flow of an electric current through said primary winding;

means for measuring, in a calibration stage, a current flow through said primary winding;

means for measuring a voltage applied across said primary winding; and evaluating means connected to the measuring means for receiving signals representing said current and said voltage and calculating therefrom a temperature of said element.

8. The apparatus defined in claim 7 wherein said element is a godet of a spinning machine for producing yarn from synthetic filaments and said evaluating unit determines a temperature of said godet from the relationship $T = F_0 (U_x/I_x) + \Delta T(U_x - U_0)$, where $F_0$ is a calibration curve which is a function of measured voltage $U_x$ and current $I_x$ and $\Delta T (U_x - U_0)$ is a purely voltage dependent correction factor.

9. The apparatus defined in claim 8 wherein, on said spinning machine a multiplicity of said elements are connected in parallel with a common voltage source and the voltage measuring means determines the voltage of said common voltage source.

10. The apparatus defined in claim 8 wherein a multiplicity of said elements are connected to a common voltage source and said voltage measuring means measures the voltage separately at each of said primary windings.

* * * * *